Oct. 7, 1947.　　　D. C. MOLLENHOUR　　　2,428,632
ARTIFICIAL ARM
Filed April 4, 1945
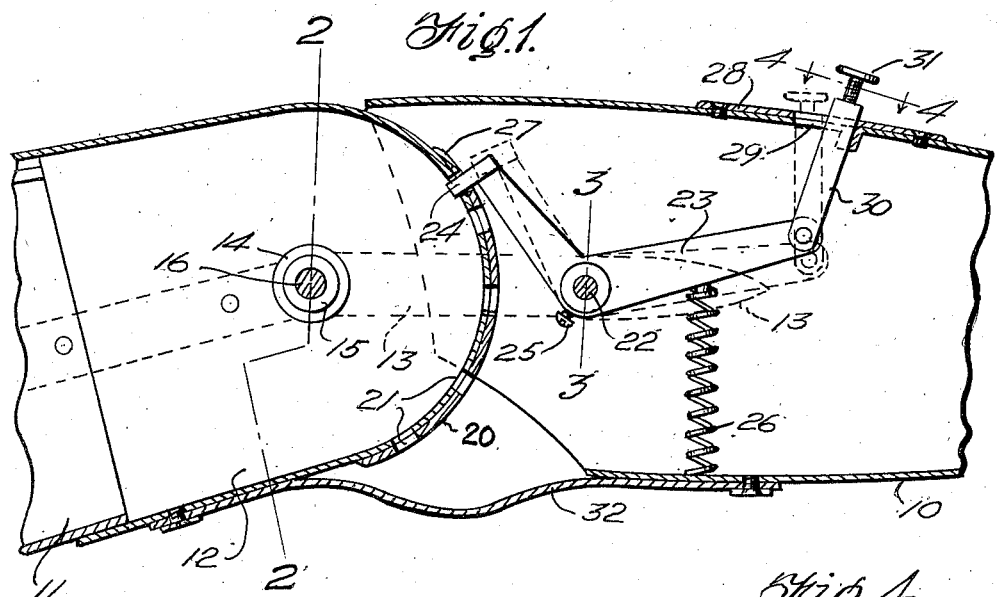
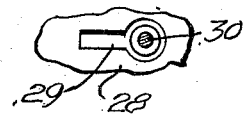
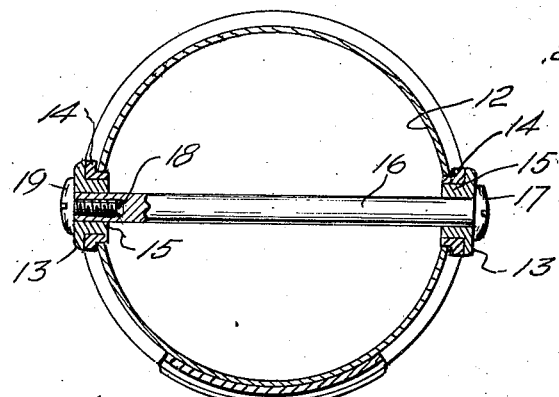
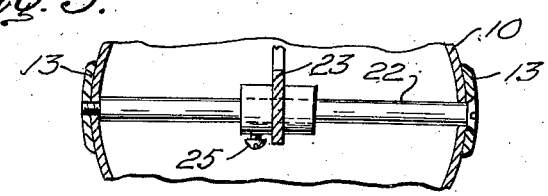
Inventor
D. C. Mollenhour,
By
Attorney Patented Oct. 7, 1947

2,428,632

UNITED STATES PATENT OFFICE 2,428,632

ARTIFICIAL ARM

Delbert Clark Mollenhour, Mentone, Ind., assignor to Franklin I. Saemann, New York, N. Y.

Application April 4, 1945, Serial No. 586,504

4 Claims. (3—12)

This invention relates to artificial arms and has special reference to an artificial arm for use in connection with amputations above the elbow joint.

More particularly the invention relates to an elbow joint for artificial arms.

One important object of the invention is to provide an improved construction of such a joint.

A second important object of the invention is to provide an improved joint for this purpose wherein the pivotal member of the joint will be so reinforced as to ensure long life.

A third important object of the invention is to provide a joint of this character wherein the upper and lower arm sections are pivoted together and may be held in desired angular relation.

A fourth important object of the invention is to provide a joint of this character wherein the lower arm section may be allowed to swing freely from the upper arm section.

A fifth important object of the invention is to provide a novel arrangement of controlling device for such an arm.

With the above and other objects in view, as will hereinafter be apparent, the invention consists in general of certain novel features of construction and combinations of parts hereinafter fully described, illustrated in the accompanying drawings, and particularly claimed.

In the accompanying drawings, like characters of reference indicate like parts in the several views and:

Fig. 1 is a longitudinal median section through a form of elbow joint embodying this invention.

Fig. 2 is a section on the line 2—2 of Fig. 1.

Fig. 3 is a fragmentary section on the line 3—3 of Fig. 1.

Fig. 4 is a section on the line 4—4 of Fig. 1.

In those cases in which amputation has taken place at the upper arm it becomes necessary to replace the elbow joint and to that end the means shown in Figs. 1 to 4 are used. In this arrangement 10 is shown as of metal and a cuff 11 fits the stump of the upper arm and forms a socket therefor. At its lower end this cuff 11 carries a hollow metal member 12 the lower end of which is substantially semicylindrical in form. At each side of the member 10 there is provided a strap 13 which extends upwardly beyond the member 10 to a position opposite the axial center of the cylindrical lower end of the member 12. At this point the member 12 is provided on each side with a socket 14; also each member 13, has at its upper end a boss 15 which fits in the respective socket 14 when the device is assembled. A pivot pin 16 passes thru the pivot ends of the members 13, being provided at one end with a screw head 17. The other end has a threaded recess 18 and a screw 19 is screwed into this recess to prevent the lugs 15 of the members 13 from springing out of the sockets. On the cylindrical portion of the member 12 is mounted a reinforcing plate 20 and a series of spaced openings 21 extend thru this reinforcing plate and the cylindrical portion of the member 12. Thru the straps 13 and the sides of the member 10 passes a pivot screw 22 whereon is mounted a bell crank lever 23 having at one end a finger 24 engageable in and disengageable from the openings 21 by biasing of the lever 23. A screw 25 passes thru the hub of the lever 23 and engages in the usual groove in shaft 22 so as to prevent longitudinal slipping of the lever on the shaft while allowing free rotary movement on such shaft. A coiled compression spring 26 urges the lever 23 to bias in such direction as to cause engagement of the finger 24 in one of the openings 21. It will here be noted that the end of the reinforcement 20 is bevelled as at 27 so that the finger 24 will not be caught by the end of this member in the event that the arm is rotated too greatly. On the member 10 is secured a plate 28 and thru the member 10 and this plate extends a key-hole slot 29. A push rod 30 passes thru this slot and has its lower end pivoted to the bell crank 23 as clearly shown in Fig. 1. Also a push button 31 is screwed into the upper end of the rod 30 in such manner as to leave space between the head of the push button and the upper end of the member 30. This shank so formed that it can pass into the narrow end of the key-hole slot 29 while the rod 30 cannot pass thru such narrow end but can pass thru the wide end. Consequently when the push button 3 is pressed to release the finger 24 from engagement with a hole 21 it may be held from such engagement by swinging the rod 30 toward the narrow end of the key-hole slot as indicated in dotted lines in Fig. 1 or may be allowed to remain at the wide end and released. With the rod 30 in the dotted line position the upper and lower joints of the artificial arm can swing freely so that a person while walking may have the natural swinging movement between the upper and lower arms. On the other hand, if it is desired to hold the upper and lower arm in some fixed position the rod 30 is moved to the larger end of the key-hole slot and released. The finger 24 will then drop into one of the holes 21 according to the relative positions of the upper and lower members of 11 and 10.

Also the upper and lower sections are connected by a flexible strap 32 which acts to guard the joint from catching the wearer's clothes.

I claim:

1. In an artificial arm, an upper arm section, a lower arm section pivotally connected to the upper arm section at the position of a normal elbow joint, an arcuate end on one of said sections concentric to the pivotal connection, said end having a series of openings spaced therearound, a pawl pivoted in the other section and spring pressed toward said arcuate end, a finger on said pawl adapted to enter selectively said openings, a push rod connected to said pawl to move it against the spring action when depressed, said pawl carrying section having a keyhole slot through which the push rod extends, said push rod being freely movable through the larger end of the slot and shouldered to restrain movement through the smaller end of said slot.

2. In an artificial arm, an upper arm section constituting a socket for the end of an amputated arm, a lower arm section, straps extending longitudinally of each section at the sides thereof, annular socket members fixed to one of said sections at the pivotal axis thereof, bosses carried by the straps of the other section and fitting in said socket members, and a threaded pin extending through side bosses and holding the same against release from said socket members.

3. In an artificial limb, an upper arm section including a hollow lower end portion of substantially hemispherical form, a pivot shaft extending diametrically through said end, a lower arm section pivoted on said shaft, a reinforcing band extending around said hollow lower end in a plane at right angles to said shaft, said band and end having spaced openings therein, a shaft carried by said lower arm parallel to the first shaft, a bell crank lever pivoted at its angle on the second shaft and having an end portion adapted selectively to enter said openings, spring means urging said end portion against said band, and means to bias spring means against engaging said openings.

4. In an artificial limb, an upper arm section including a hollow lower end portion of substantially hemispherical form, a pivot shaft extending diametrically through said end, a lower arm section pivoted on said shaft, a reinforcing band extending around said hollow lower end in a plane at right angles to said shaft, said band and end having spaced openings therein, a shaft carried by said lower arm parallel to the first shaft, a bell crank lever pivoted at its angle on the second shaft and having an end portion adapted selectively to enter said openings, spring means urging said end portion against said band, said lower section having a keyhole opening therein, and a push rod having a cross-section moveable freely through the larger end of the keyhole opening and having a reduced portion latching in the smaller end of the keyhole opening, said push rod being pivoted to the bell-crank lever to bias the same against the action of the spring means.

DELBERT CLARK MOLLENHOUR.

REFERENCES CITED

The following references are of record in the file of this patent:

UNITED STATES PATENTS

| Number | Name | Date |
|---|---|---|
| 1,301,575 | Krawczynski | Apr. 22, 1919 |
| 1,402,709 | Blatchford | Jan. 3, 1922 |
| 1,914,882 | Caron | June 20, 1933 |